(12) United States Patent
Tsai et al.

(10) Patent No.: US 8,451,085 B1
(45) Date of Patent: May 28, 2013

(54) CO-FIRED MULTI-LAYER STACK CHIP RESISTOR AND MANUFACTURING METHOD

(75) Inventors: Yung Cheng Tsai, Taoyuan (TW); Ching Jen Tsai, Taoyuan (TW); Tung Yi Chou, Taoyuan (TW); Hung Chun Wu, Taoyuan (TW)

(73) Assignee: Prosperity Dielectrics Co., Ltd., Taoyuan (TW)

( * ) Notice: Subject to any disclaimer, the term of this patent is extended or adjusted under 35 U.S.C. 154(b) by 0 days.

(21) Appl. No.: 13/528,955

(22) Filed: Jun. 21, 2012

(30) Foreign Application Priority Data

Nov. 18, 2011 (TW) ............................. 100142391 A

(51) Int. Cl.
*H01C 1/012* (2006.01)
(52) U.S. Cl.
USPC ............ 338/309; 338/307; 338/332; 338/328
(58) Field of Classification Search
CPC ........ H01C 17/006; H01C 7/003; H01C 1/142; H01C 1/148; H01L 2924/01078; H01L 2924/19041
USPC .................................. 338/309, 328, 322, 332
See application file for complete search history.

(56) References Cited

U.S. PATENT DOCUMENTS

| 6,124,769 | A  | * | 9/2000  | Igarashi et al. | ............... | 333/172 |
| 6,160,472 | A  | * | 12/2000 | Arashi et al.   | .................... | 338/21  |
| 7,075,404 | B2 | * | 7/2006  | Hirose et al.   | .................... | 338/21  |
| 8,026,787 | B2 | * | 9/2011  | Choi et al.     | ....................... | 338/20  |

* cited by examiner

*Primary Examiner* — Kyung Lee
(74) *Attorney, Agent, or Firm* — Rosenberg, Klein & Lee

(57) ABSTRACT

A co-fired multi-layer stack chip resistor is provided. The co-fired multi-layer stack chip resistor includes a ceramic substrate and a multi-layer stack resistance structure monomer. The ceramic substrate is formed by stacking multiple layers of the ceramic membranes, wherein the ceramic membranes is formed of a bearing membrane and a porcelain slurry with the solvent, the binder and the dispersant. The multi-layer stack resistance structure monomer is stacked on the ceramic substrate, and includes multiple bearing membranes and multiple resistive layers, wherein each resistive layer is formed on the surface of the corresponding bearing membrane, the resistive layers are parallel to each other, and the contiguous resistive layers are stacked with the interval of the predetermined distance along the vertical direction. The multi-layer stack resistance structure monomer and the ceramic substrate are sintered and shaped with the predetermined sintering temperature and the predetermined sintering time in a kiln stove.

10 Claims, 10 Drawing Sheets

CO-FIRED MULTI-LAYER STACK CHIP RESISTOR AND MANUFACTURING METHOD

FIELD OF THE INVENTION

The present invention relates to a chip resistor. More particularly, the present invention relates to a co-fired multi-layer stack chip resistor and manufacturing method thereof.

BACKGROUND OF THE INVENTION

Due to the factor of cost and character of the passive components, the passive components can not be integrated inside the Integrated circuits completely, but need to Implemented by outside connecting methods, etc. . . . These methods will easily cause the shortcoming of low reliability, high manufacturing cost and such that the area of the substrate can not easily be reduced. Thus, the co-fired technology is provided to solve the above mentioned problem. The co-fired technology mainly uses oxide materials in the manufacturing environment with high temperature and oxygen to make the oxide electrodes instead of the metal electrodes on the oxide ceramic layer manufactured from Insulating ceramic materials to form the multi-layer or single-layer oxide ceramic components.

The co-fired technology can easily achieve the integration ability of the module and the passive components, and the considerations of space and cost can be better taken into account. By stacking the ceramic substrates with several micro meter thicknesses and embedding the ceramic substrates into the passive components and integrated circuits, the passive components and the circuit wiring can be centralized inside the substrate more efficiently to achieve to purpose of saving space and reducing cost. The co-fired technology has become the development trend of future integrated and modular electric components via the excellent electrical, mechanical and thermal character.

The resistor manufacturing method using the prior co-fired technology includes the following steps. First, an aluminum oxide substrate is made by insulation materials. Then, a resistive layer is disposed on the surface of the aluminum oxide substrate by printing or sputter conductive materials. Then, a protective layer is disposed on the resistive layer by using insulating ceramic materials such that the protective layer is as the substrate for another resistive layer. The above steps are repeated to stack multiple layers of resistive layers. Finally, the whole resistor is package by disposing an insulating protective layer, and then sintered and shaped. In addition, a pair of terminal poles is electrically connected to two terminal planes of each resistive layer to form a completed resistor.

However, the above mentioned resistor manufacturing method is arranged for the general single-layer resistor. The resistor with stack structure is manufactured just by repeating the same method for extend the function. The process is complex and trivial, and the co-fired technology is not utilized for the most efficient use.

SUMMARY OF THE INVENTION

The main purpose of the present invention is to provide a co-fired multi-layer stack chip resistor and manufacturing method thereof via co-fired technology to implement the multi-layer stack chip resistor structure.

In order to achieve the aforementioned object, a technical aspect of the present invention relates to the following steps. First, a porcelain slurry with the solvent, the binder and the dispersant is prepared for attaching on the surface of a bear membrane to form a ceramic membrane. Then, a ceramic substrate having the predetermined thickness is formed by stacking multiple layers of the ceramic membranes. Then, a resistive layer of formed on the surface of the ceramic substrate, and the terminal portions of the resistive layer extend along the horizontal direction respectively to form the terminal connectors. The ceramic membrane is formed on the surface of the resistive layer.

By repeating the aforementioned two steps several times, a multi-layer stack resistance structure monomer with multiple resistive layers is formed on the ceramic substrate, wherein the resistive layers are parallel to each other, and the contiguous resistive layers are stacked with the interval of the predetermined distance along the vertical direction. The multi-layer stack resistance structure monomer and the ceramic substrate are sintered and shaped with the predetermined sintering temperature and the predetermined sintering time in a kiln stove after stacking the multi-layer stack resistance structure monomer on the ceramic substrate. A pair of terminal poles is formed on two terminal pole planes of the shaped multi-layer stack resistance structure monomer by using conductive materials, and the terminal connectors of each resistive layer are connected to the terminal poles to form a multi-layer stack chip resistor.

The co-fired multi-layer stack chip resistor of the present invention includes: a ceramic substrate having the predetermined thickness, and formed by stacking multiple layers of the ceramic membranes, wherein the ceramic membranes is formed of a bearing membrane and a porcelain slurry with the solvent, the binder and the dispersant, wherein the porcelain slurry is attached to the surface of the bearing membrane; and a multi-layer stack resistance structure monomer stacked on the ceramic substrate, wherein the multi-layer stack resistance structure monomer includes multiple bearing membranes and multiple resistive layers, wherein each resistive layer is formed on the surface of the corresponding bearing membrane, the resistive layers are parallel to each other, and the contiguous resistive layers are stacked with the interval of the predetermined distance along the vertical direction, wherein the multi-layer stack resistance structure monomer and the ceramic substrate are sintered and shaped with the predetermined sintering temperature and the predetermined sintering time in a kiln stove after stacking the multi-layer stack resistance structure monomer on the ceramic substrate.

Compared to the prior manufacturing method, the present invention focuses on the multi-layer stack chip resistor structure to form the monomers having multiple resistive layers first, then to fill the casting porcelain slurry as insulation materials into the porcelain slurry casting space among the resistive layers, and finally to proceed with a co-firing process, thus to eliminate from the trivial stack process, and save the time of drying operation after printing and sputtering.

Besides, the multi-layer stack chip resistor structure of the present invention can adjust the resistance value by a resistance modulation trimming groove or via modulating the width or the thickness of at least one layer of the resistive layers of the multi-layer stack chip resistor structure.

The specific methods and structure design of the present invention will further be illustrated by the following embodiment and figures.

DETAILED DESCRIPTION OF THE PREFERRED EMBODIMENTS

Figure 1:
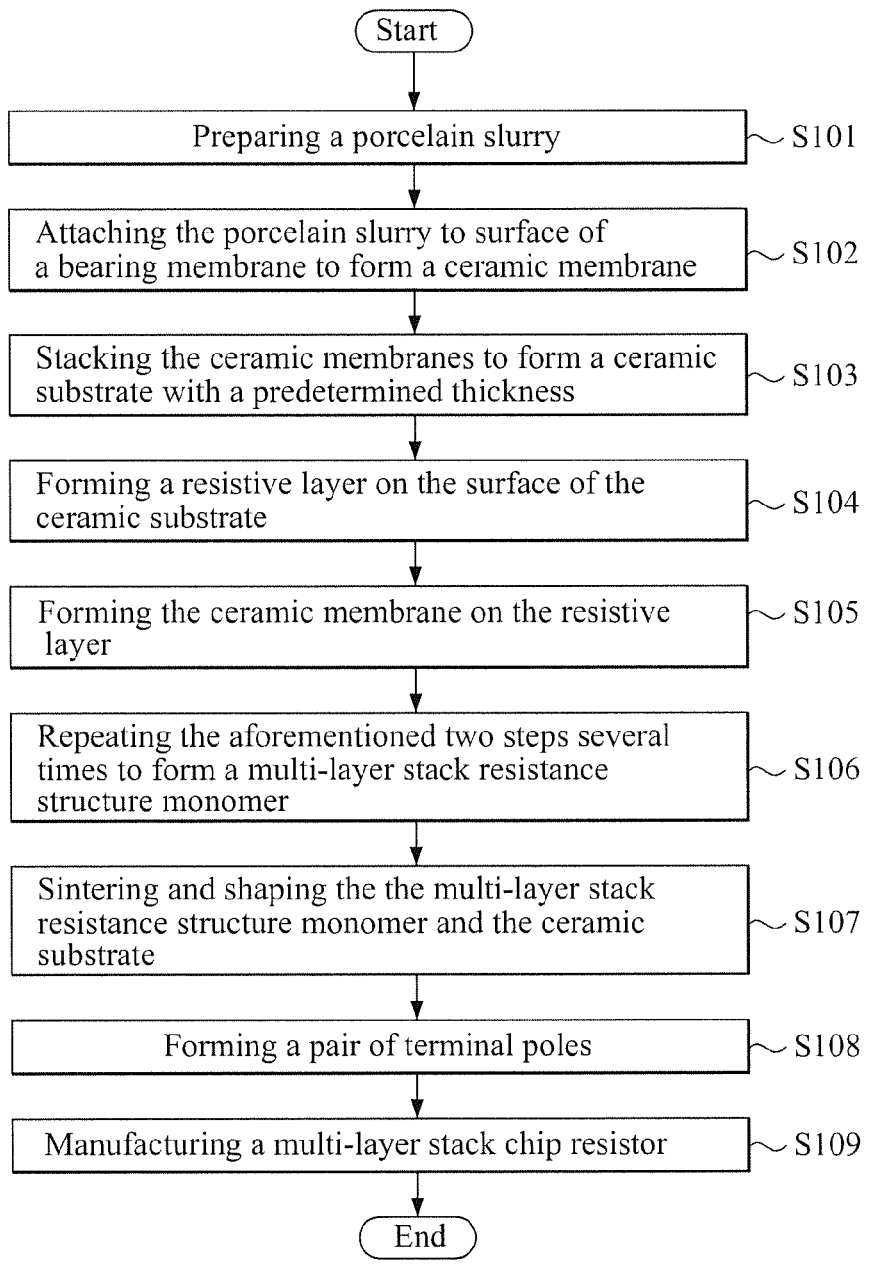
FIG. 1 is a flow chart of the co-fired multi-layer stack chip resistor manufacturing method according to the first embodiment of the present invention.

Referring to FIG. 1, FIG. 1 is a flow chart of the co-fired multi-layer stack chip resistor manufacturing method according to the first embodiment of the present invention. First, a porcelain slurry with the solvent, the binder and the dispersant is prepared (S101), the porcelain slurry is attached on the surface of a bear membrane to form a ceramic membrane (S102). Then, a ceramic substrate having the predetermined thickness is formed by stacking multiple layers of the ceramic membranes (S103). Then, a resistive layer of formed on the surface of the ceramic substrate, and the terminal portions of the resistive layer extend along the horizontal direction respectively to form the terminal connectors (S104). The ceramic membrane is formed on the surface of the resistive layer (S105).

By repeating the aforementioned two steps several times, a multi-layer stack resistance structure monomer with multiple resistive layers is formed on the ceramic substrate (S106). The resistive layers are parallel to each other, and the contiguous resistive layers are stacked with the interval of the predetermined distance along the vertical direction. The multi-layer stack resistance structure monomer and the ceramic substrate are sintered and shaped with the predetermined sintering temperature and the predetermined sintering time in a kiln stove after stacking the multi-layer stack resistance structure monomer on the ceramic substrate (S107). A pair of terminal poles is formed on two terminal pole planes of the shaped multi-layer stack resistance structure monomer by using conductive materials (S108), and the terminal connectors of each resistive layer are connected to the terminal poles to form a multi-layer stack chip resistor (S109).

Figure 2:
FIG. 2 is the first structure cross section of the co-fired multi-layer stack chip resistor manufacturing method according to the first embodiment of the present invention.
Figure 3:
FIG. 3 is the second structure cross section of the co-fired multi-layer stack chip resistor manufacturing method according to the first embodiment of the present invention.
Figure 4:
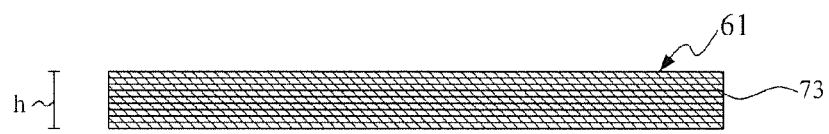
FIG. 4 is the third structure cross section of the co-fired multi-layer stack chip resistor manufacturing method according to the first embodiment of the present invention.
Figure 5:
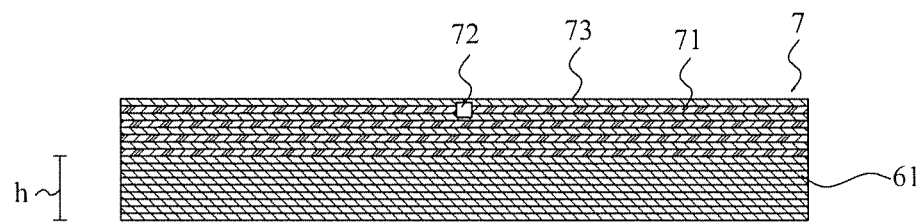
FIG. 5 is the fourth structure cross section of the co-fired multi-layer stack chip resistor manufacturing method according to the first embodiment of the present invention.
Figure 6:
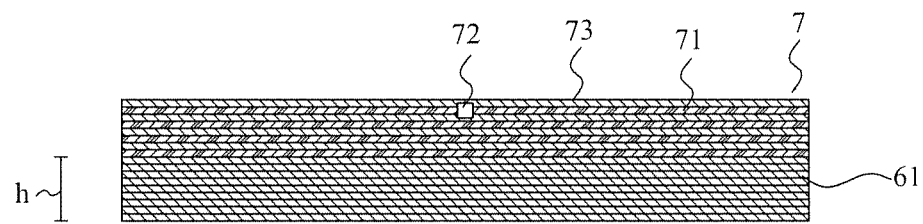
FIG. 6 is the fifth structure cross section of the co-fired multi-layer stack chip resistor manufacturing method according to the first embodiment of the present invention.
Figure 7:
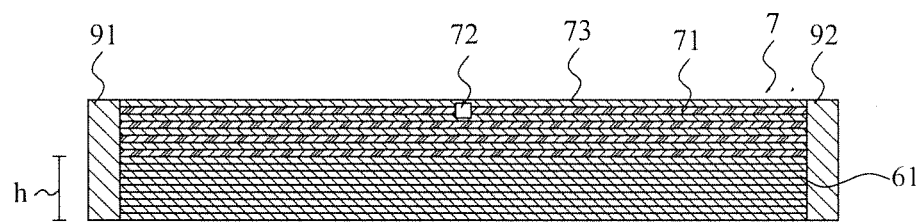
FIG. 7 is the sixth structure cross section of the co-fired multi-layer stack chip resistor manufacturing method according to the first embodiment of the present invention.
Figure 8:
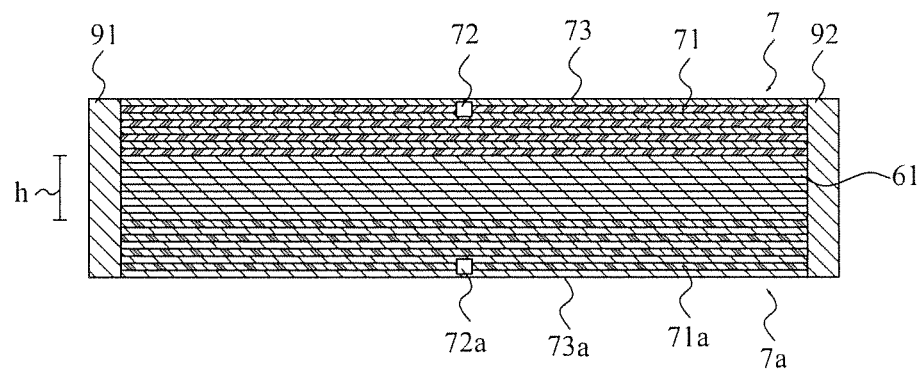
FIG. 8 is the seventh structure cross section of the co-fired multi-layer stack chip resistor manufacturing method according to the first embodiment of the present invention.

Referring to FIGS. 2~8, FIGS. 2~8 are the structure cross section of the co-fired multi-layer stack chip resistor manufacturing method according to the first embodiment of the present invention. FIG. 2 shows the bearing membrane 731. FIG. 3 shows the ceramic membrane 73 formed by attaching the porcelain slurry to the bearing membrane 731. FIG. 4 shows the ceramic substrate 61 having predetermined thickness h, wherein the ceramic substrate 61 is formed by stacking multiple layers of ceramic membrane 73. FIG. 5 shows the multi-layer stack resistance structure monomer 7 having multiple resistive layers 71, wherein the multi-layer stack resistance structure monomer 7 is formed on the surface of the ceramic substrate 61. FIG. 6 shows the multi-layer stack resistance structure monomer 7 and the ceramic substrate 61, wherein the multi-layer stack resistance structure monomer 7 and the ceramic substrate 61 are sintered and shaped with the predetermined sintering temperature and the predetermined sintering time in a kiln stove. FIG. 7 shows a pair of terminal poles 91,92 is formed on two terminal pole planes of the shaped multi-layer stack resistance structure monomer 7 by using conductive materials. FIG. 8 shows another multi-layer stack resistance structure monomer 7a formed on the rear surface of the ceramic substrate 61 by using the same method.

Figure 9:
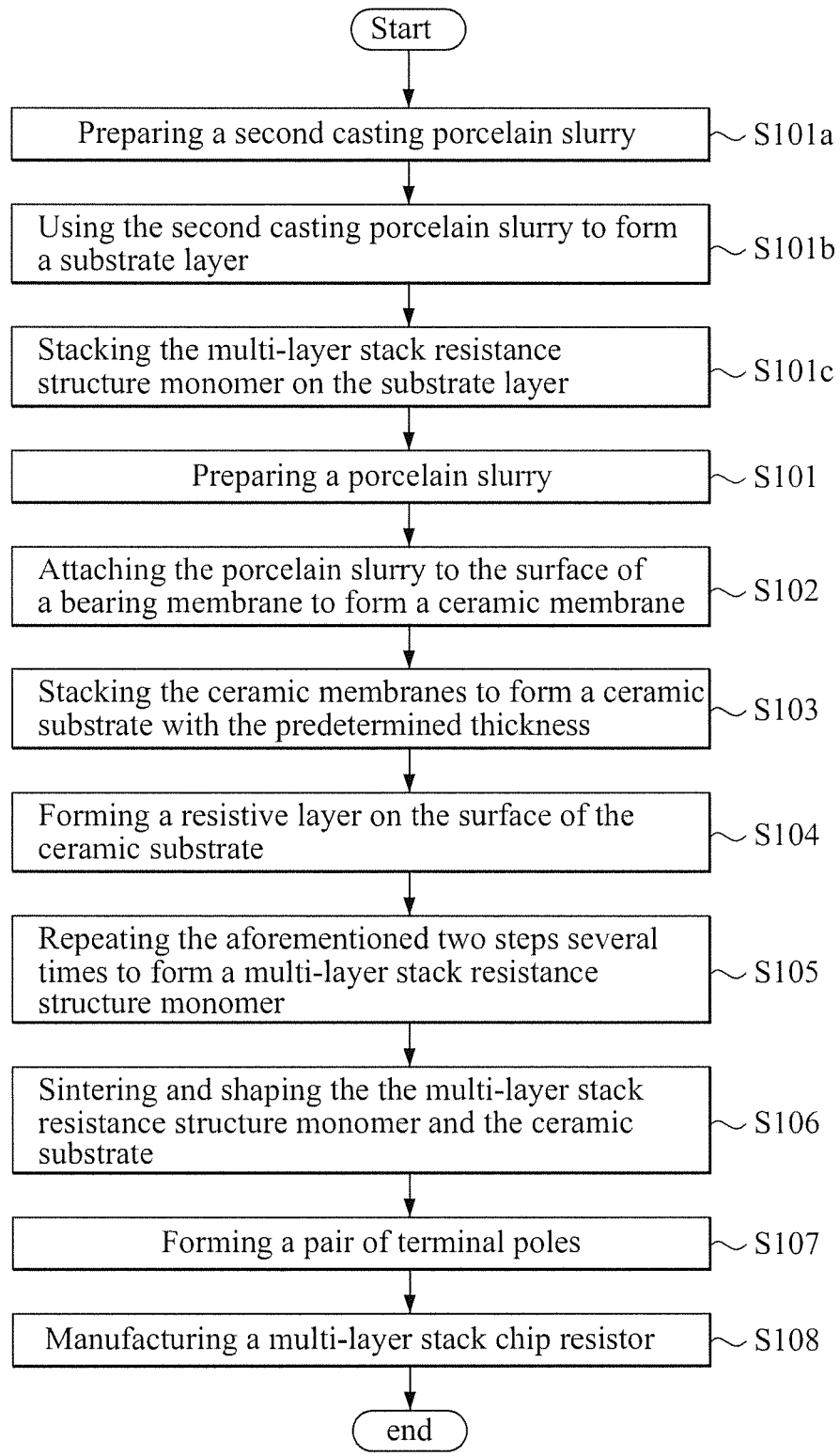
FIG. 9 is a flow chart of the co-fired multi-layer stack chip resistor manufacturing method according to the second embodiment of the present invention.

Referring to FIG. 9, FIG. 9 is a flow chart of the co-fired multi-layer stack chip resistor manufacturing method according to the second embodiment of the present invention. Compared to the manufacturing process of the first embodiment, a second casting porcelain slurry may be prepared (S101a) before the porcelain slurry is prepared (S101) in the second embodiment. A substrate layer is formed by using the second casting porcelain slurry (S101b), and the multi-layer stack resistance structure monomer is stacked on the substrate layer (S101c).

Figure 10:
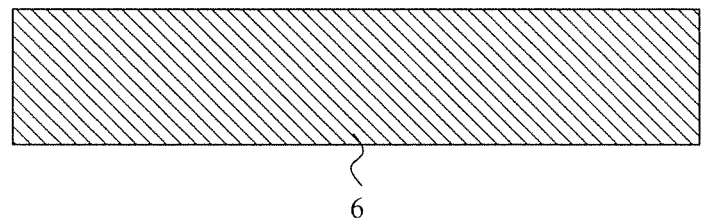
FIG. 10 is the first structure cross section of the co-fired multi-layer stack chip resistor manufacturing method according to the second embodiment of the present invention.
Figure 11:
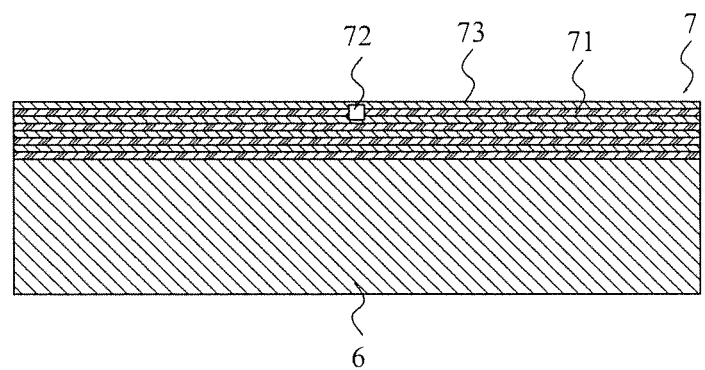
FIG. 11 is the second structure cross section of the co-fired multi-layer stack chip resistor manufacturing method according to the second embodiment of the present invention.
Figure 12:
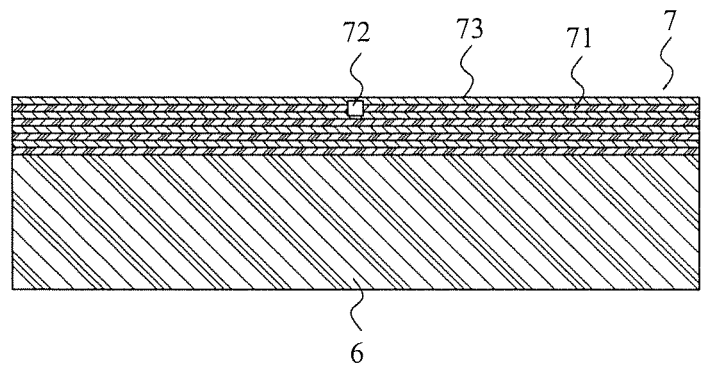
FIG. 12 is the third structure cross section of the co-fired multi-layer stack chip resistor manufacturing method according to the second embodiment of the present invention.
Figure 13:
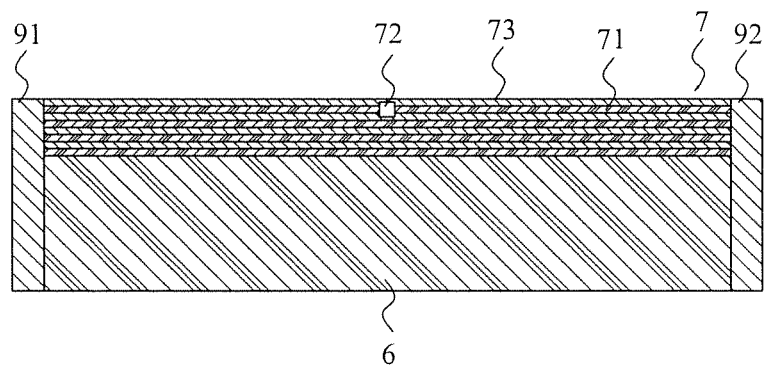
FIG. 13 is the fourth structure cross section of the co-fired multi-layer stack chip resistor manufacturing method according to the second embodiment of the present invention.

Referring to FIG. 10~13, FIG. 10~13 are the structure cross section of the co-fired multi-layer stack chip resistor manufacturing method according to the second embodiment of the present invention. FIG. 10 shows the substrate layer 6 formed of the second casting porcelain slurry containing the porcelain powder and the binder. FIG. 11 shows the multi-layer stack resistance structure monomer 7 having multiple resistive layers 71, wherein the multi-layer stack resistance structure monomer 7 is formed on the surface of the substrate layer 6. FIG. 12 shows the multi-layer stack resistance structure monomer 7 and the ceramic substrate 6, wherein the multi-layer stack resistance structure monomer 7 and the ceramic substrate 6 are sintered and shaped with the predetermined sintering temperature and the predetermined sintering time in a kiln stove. FIG. 13 shows a pair of terminal poles 91,92 is formed on two terminal pole planes of the shaped multi-layer stack resistance structure monomer 7 by using conductive materials. FIG. 13 shows the completed multi-layer stack chip resistor after forming the terminal poles 91,92.

Referring to FIG. 7, the co-fired multi-layer stack chip resistor according the first embodiment of the present invention includes: a ceramic substrate 61 having the predetermined thickness h, and formed by stacking multiple layers of the ceramic membranes 73, wherein the ceramic membranes 73 is formed of a bearing membrane 731 and a porcelain slurry with the solvent, the binder and the dispersant, wherein the porcelain slurry is attached to the surface of the bearing membrane 731; and a multi-layer stack resistance structure monomer 7 stacked on the ceramic substrate 61, wherein the multi-layer stack resistance structure monomer 7 includes multiple bearing membranes 731 and multiple resistive layers 71, wherein each resistive layer 71 is formed on the surface of the corresponding bearing membrane 731, the resistive layers 71 are parallel to each other, and the contiguous resistive layers 71 are stacked with the interval of the predetermined distance along the vertical direction, wherein the multi-layer stack resistance structure monomer 7 and the ceramic substrate 61 are sintered and shaped with the predetermined sintering temperature and the predetermined sintering time in a kiln stove after stacking the multi-layer stack resistance structure monomer 7 on the ceramic substrate 61.

The first and the second terminal portions of each resistive layer of the co-fired multi-layer stack chip resistor of the present invention extend respectively alone the horizontal direction to form the terminal connectors, and the terminal connectors are respectively exposed to the first and the second terminal planes of the multi-layer stack resistance structure monomer 7. The first terminal pole 91 is formed on the first terminal plane of the multi-layer stack resistance structure monomer 7 with conducting materials, and connected to the first terminal portion of every resistive layer 71. The second terminal pole 92 is formed on the second terminal plane of the multi-layer stack resistance structure monomer 7 with conducting materials, and connected to the second terminal portion of every resistive layer 71.

Referring to FIG. 10~13, the co-fired multi-layer stack chip resistor according to the second embodiment of the present invention further includes a substrate layer 6 formed of the second casting porcelain slurry containing the porcelain powder and the binder, and having a front surface and a rear surface, wherein the two terminals of the substrate layer 6 form the terminal pole planes, respectively. The porcelain slurry and the second casting porcelain slurry are composed of different porous ceramic materials, or the same porous ceramic materials with different pore spaces. At least one resistance modulation trimming groove 72 is formed in the resistive layer 71 wherein the resistance value of the resistive layers 71 is adjusted by modulating the width or the thickness of at least one layer of the resistive layers 71.

Figure 14:
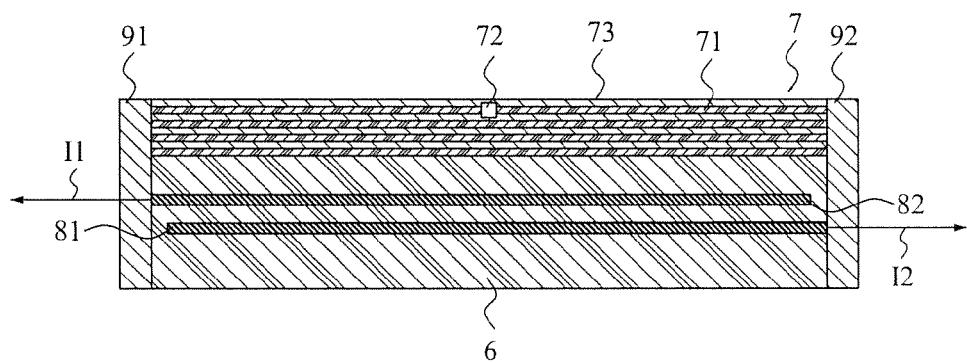
FIG. 14 is the structure cross section of the co-fired multi-layer stack chip resistor embedded with the mental plate according to the second embodiment of the present invention.

Referring to FIG. 14, for enhancing the heat dissipation effect, a pair of metal thermal conductivity layers 81,82 may be embedded in the substrate layer 6 of the co-fired multi-layer stack chip resistor according the second embodiment of the present invention. Each metal thermal conductivity layer 81,82 extend along the horizontal direction to one terminal pole plane of the substrate layer 6 to transmit the heat generated from the resistive layer 71 through the metal thermal conductivity layers 81,82 alone the heat dissipation 11,12 to the outside via the terminal poles 91,92 to achieve the purpose of enhancing the heat dissipation effect by the structure.

Figure 15:
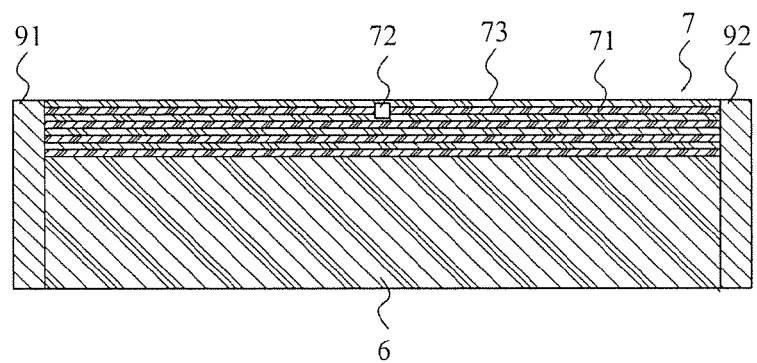
FIG. 15 is the structure cross section of the co-fired multi-layer stack chip resistor having the same components according to the second embodiment of the present invention.
Figure 16:
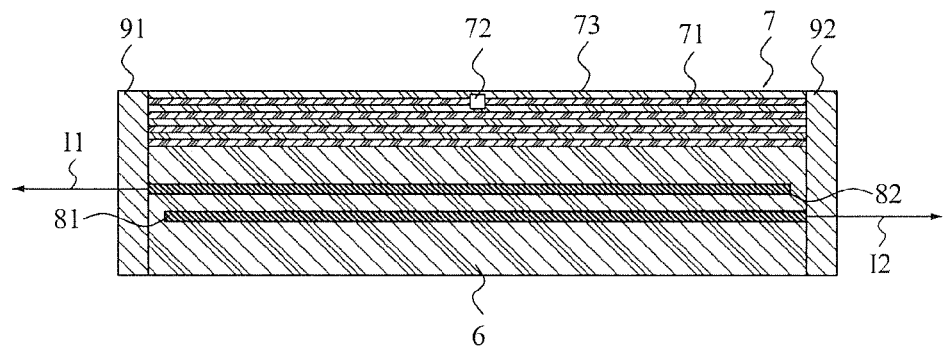
FIG. 16 is the structure cross section of the co-fired multi-layer stack chip resistor having the same components and embedded with the mental plate according to the second embodiment of the present invention.

Referring to FIGS. 15~16, the parallel type multi-layer stack chip resistor according to the second embodiment of the present invention is implemented by the same method and structure, but the difference is that the porcelain slurry and the second casting porcelain slurry are composed of the same porous ceramic materials.

Figure 17:
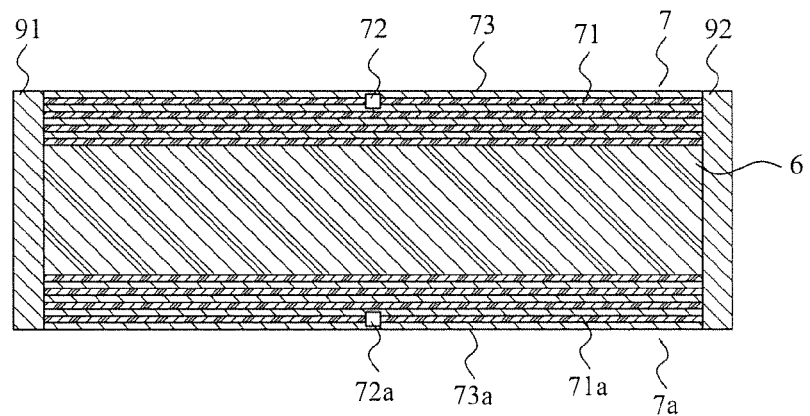
FIG. 17 is the structure cross section of the co-fired multi-layer stack chip resistor with double-layer structure according to the second embodiment of the present invention.
Figure 18:
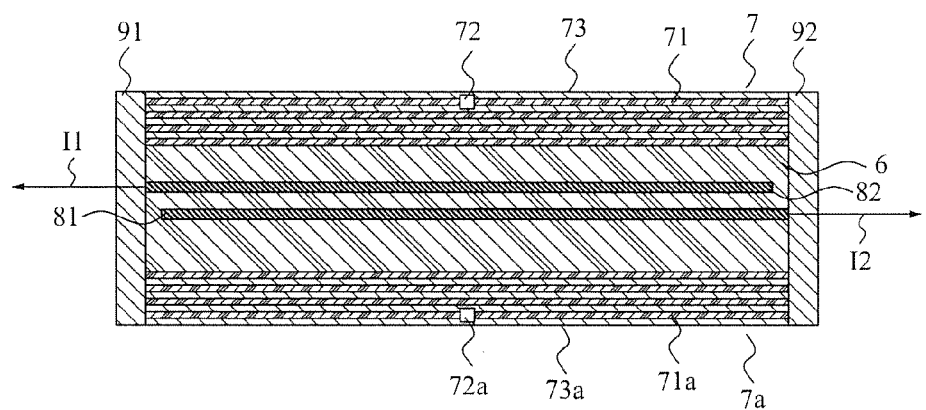
FIG. 18 is the structure cross section of the co-fired multi-layer stack chip resistor with double-layer structure and embedded with the mental plate according to the second embodiment of the present invention.

Referring to FIG. 17~18, the parallel type multi-layer stack chip resistor according to the second embodiment of the present invention is implemented by the same method, material and structure. Besides, another multi-layer stack resistance structure monomer 7a is formed on the rear surface of the substrate layer 6.

Although the present invention has been described with reference to the above embodiments, these embodiments are not intended to limit the present invention. It will be apparent to those skilled in the art that various modifications and variations can be made without departing from the scope or spirit of the present invention. Therefore, the scope of the present invention shall be defined by the appended claims.

What is claimed is:

1. A co-fired multi-layer stack chip resistor, comprising:
a ceramic substrate having a predetermined thickness, and formed by stacking a plurality of ceramic membranes, wherein the ceramic membranes is formed of a bearing membrane and a porcelain slurry with the solvent, the binder and the dispersant, wherein the porcelain slurry is attached to the surface of the bearing membrane;
a multi-layer stack resistance structure monomer stacked on the ceramic substrate, and comprising a plurality of bearing membranes and a plurality of resistive layers, wherein each resistive layer is formed on the surface of the corresponding bearing membrane, the resistive layers are parallel to each other, and the contiguous resistive layers are stacked with the interval of the predetermined distance along the vertical direction;
wherein the multi-layer stack resistance structure monomer and the ceramic substrate are sintered and shaped with the predetermined sintering temperature and the predetermined sintering time in a kiln stove after stacking the multi-layer stack resistance structure monomer on the ceramic substrate;
wherein the first and the second terminal portions of each resistive layer extend respectively alone the horizontal direction to form the terminal connectors, and the terminal connectors are respectively exposed to the first and the second terminal planes of the multi-layer stack resistance structure monomer;
a first terminal pole formed on the first terminal plane of the multi-layer stack resistance structure monomer with conducting materials, and connected to the first terminal portion of every resistive layer; and
a second terminal pole formed on the second terminal plane of the multi-layer stack resistance structure monomer with conducting materials, and connected to the second terminal portion of every resistive layer.

2. The co-fired multi-layer stack chip resistor of claim 1, wherein at least a resistance modulation trimming groove is formed in the resistive layer.

3. The co-fired multi-layer stack chip resistor of claim 1, wherein the resistance value of the resistive layers is adjusted by modulating the width or the thickness of at least one layer of the resistive layers.

4. The co-fired multi-layer stack chip resistor of claim 1, further comprising a substrate layer formed of the second casting porcelain slurry containing the porcelain powder and the binder, and having a front surface and a rear surface, wherein the two terminals of the substrate layer form a terminal pole plane, respectively.

5. The co-fired multi-layer stack chip resistor of claim 4, wherein a second resistance sintering layer is formed on the rear surface of the substrate layer, and the multi-layer stack resistance structure monomer is formed by sintering the porcelain slurry in the porcelain slurry casting space between the resistive layers into molding with the predetermined sintering temperature and the predetermined sintering time after filling the first casting porcelain slurry containing the porcelain powder and the binder into the porcelain slurry casting space between the resistive layers.

6. The co-fired multi-layer stack chip resistor of claim 4, wherein the porcelain slurry and the second casting porcelain slurry are composed of the same porous ceramic materials.

7. The co-fired multi-layer stack chip resistor of claim 4, wherein the porcelain slurry and the second casting porcelain slurry are composed of different porous ceramic materials, or the same porous ceramic materials with different pore spaces.

8. The co-fired multi-layer stack chip resistor of claim 4, wherein the two terminal pole planes are respectively formed on each terminal of the substrate layer, and a pair of metal thermal conductivity layers parallel spaced with the predetermined distance are embedded in the substrate layer, wherein each metal thermal conductivity layer extends along the horizontal direction to one terminal pole plane of the substrate layer.

9. A co-fired multi-layer stack chip resistor manufacturing method, comprising:
  (a) preparing a porcelain slurry with the solvent, the binder and the dispersant;
  (b) attaching the porcelain slurry to the surface of a bearing membrane to form a ceramic membrane;
  (c) stacking the ceramic membranes to form a ceramic substrate with the predetermined thickness;
  (d) forming a resistive layer on the surface of the ceramic substrate, wherein each of the terminal portions of the resistive layer extends respectively alone the horizontal direction to form the terminal connectors;
  (e) forming the ceramic membrane on the resistive layer;
  (f) repeating the step (d)~(e) several times to form a multi-layer stack resistance structure monomer on the ceramic substrate, wherein the multi-layer stack resistance structure monomer has multiple resistive layers, the resistive layers are parallel to each other and stacked with the interval of the predetermined distance along the vertical direction, and the multi-layer stack resistance structure monomer and the ceramic substrate are sintered and shaped with the predetermined sintering temperature and the predetermined sintering time in a kiln stove; and
  using the conductive materials to form a pair of terminal poles respectively on two terminal pole planes of the shaped multi-layer stack resistance structure monomer, and connecting the terminal connectors of each resistive layer to the terminal pole to manufacture a multi-layer stack chip resistor.

10. The co-fired multi-layer stack chip resistor manufacturing method of claim 9, further comprising the following steps before step (a):
  (h) preparing a second casting porcelain slurry;
  (i) using the second casting porcelain slurry to form a substrate layer; and
  (j) stacking the multi-layer stack resistance structure monomer on the substrate layer.

* * * * *